United States Patent [19]

Engel et al.

[11] Patent Number: 4,993,899
[45] Date of Patent: Feb. 19, 1991

[54] APPARATUS FOR AUTOMATIC INSERTION AND ALIGNMENT OF FREIGHT UNITS

[75] Inventors: Hinrich Engel, Bremen; Hartmut Sempert, Delmenhorst; Gerhard Palme, Ganderkesee, all of Fed. Rep. of Germany

[73] Assignee: Messerschmitt-Bölkow-Blohm GmbH, Ottobrunn, Fed. Rep. of Germany

[21] Appl. No.: 489,454

[22] Filed: Mar. 6, 1990

[30] Foreign Application Priority Data

Mar. 14, 1989 [DE] Fed. Rep. of Germany ....... 3908257

[51] Int. Cl.$^5$ .............................................. B63B 25/22
[52] U.S. Cl. ........................................ 410/69; 410/79; 244/118.1; 244/137.1
[58] Field of Search ....................... 410/69, 79, 46, 78, 410/92; 198/345.3, 464.2, 345.1; 244/118.1, 137.1, 137.3; 193/45

[56] References Cited

U.S. PATENT DOCUMENTS

| | | | |
|---|---|---|---|
| 3,933,101 | 1/1976 | Blas | 410/69 |
| 4,344,726 | 8/1982 | Naffa | 410/79 |
| 4,349,302 | 9/1982 | Ferguson, Jr. | 410/79 X |
| 4,457,649 | 7/1984 | Vogg et al. | 410/69 X |

Primary Examiner—Robert J. Spar
Assistant Examiner—Craig Slavin
Attorney, Agent, or Firm—Toren, McGeady & Associates

[57] ABSTRACT

An apparatus is used for automatic insertion and alignment of freight units, such as pallets or containers, into mobile cargo compartments. The apparatus includes a pivotal guide lever with a hold-down member arranged at an entry guide in the region of an opening into the mobile cargo compartment. For moving the freight into the cargo compartment, the guide lever is displaced by an adjustment lever extending upwardly from the bottom of the cargo compartment. The adjustment lever can be displaced from the path of on-coming freight units so that the freight unit passes over the adjustment lever.

10 Claims, 4 Drawing Sheets

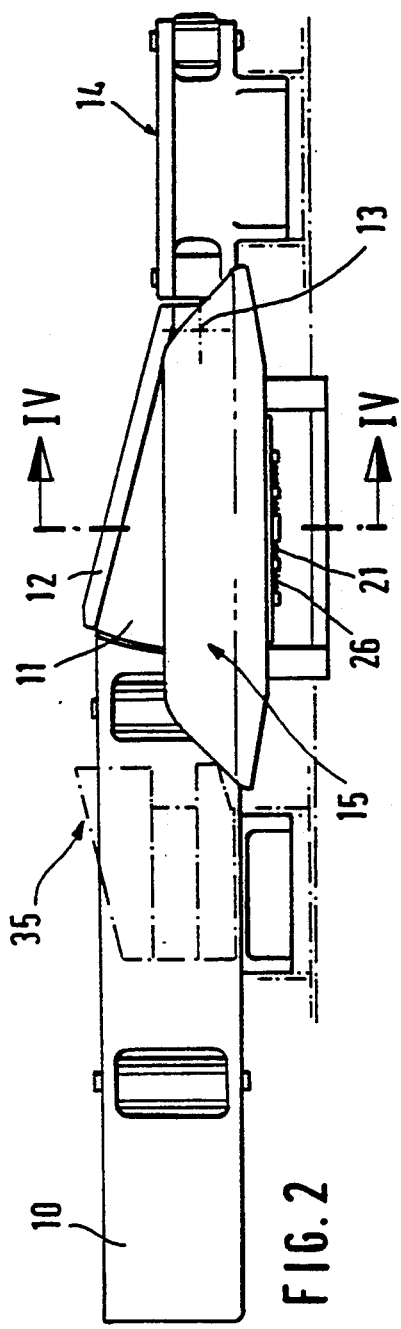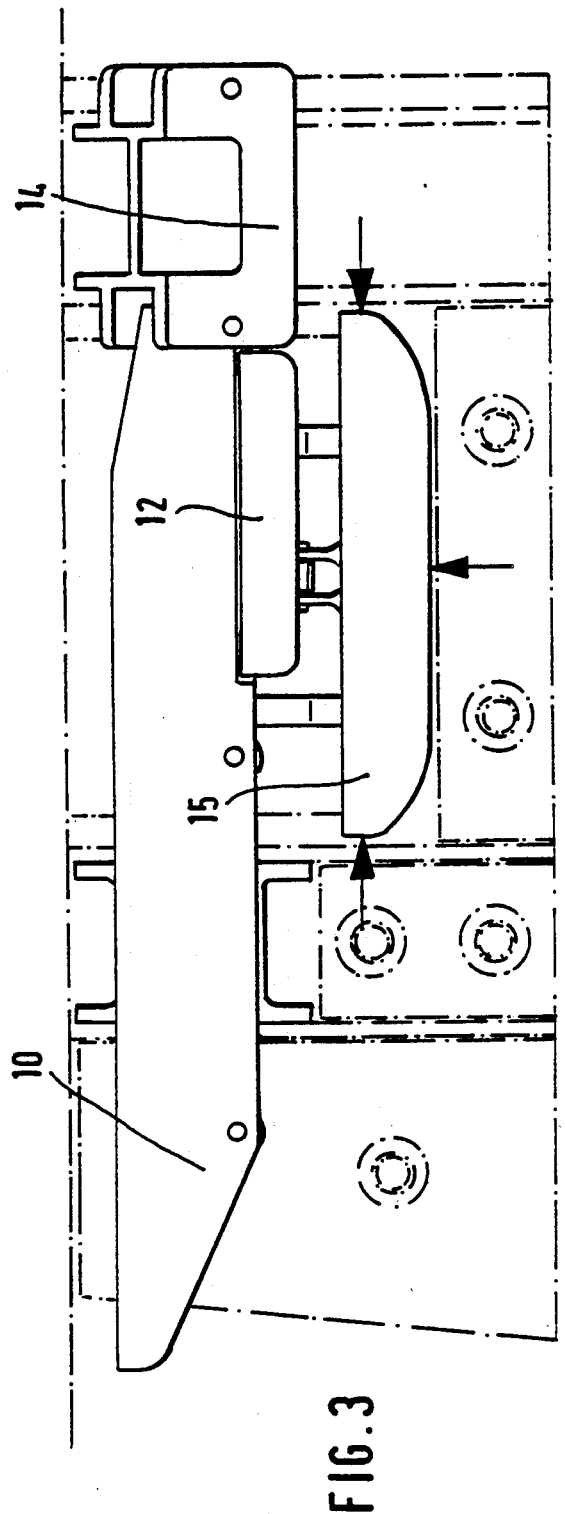

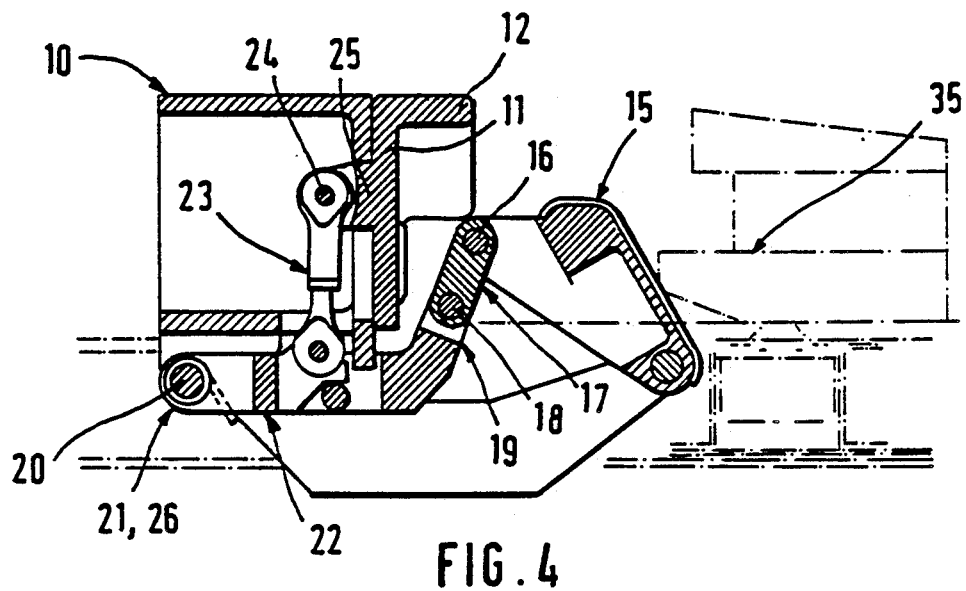
FIG. 4
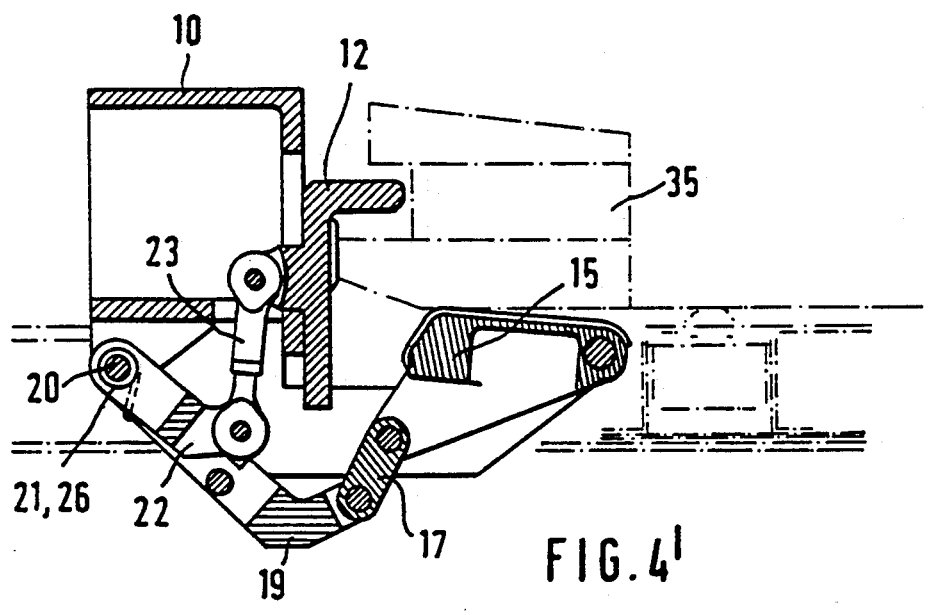
FIG. 4¹

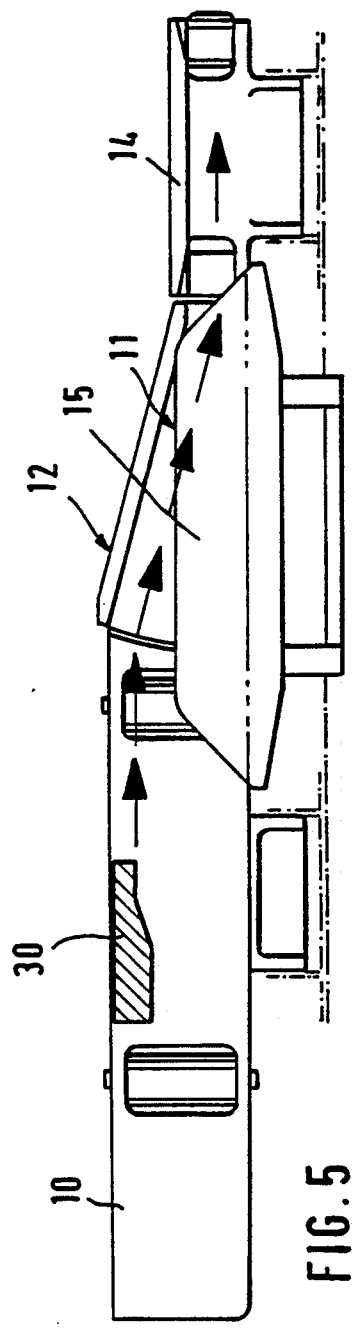
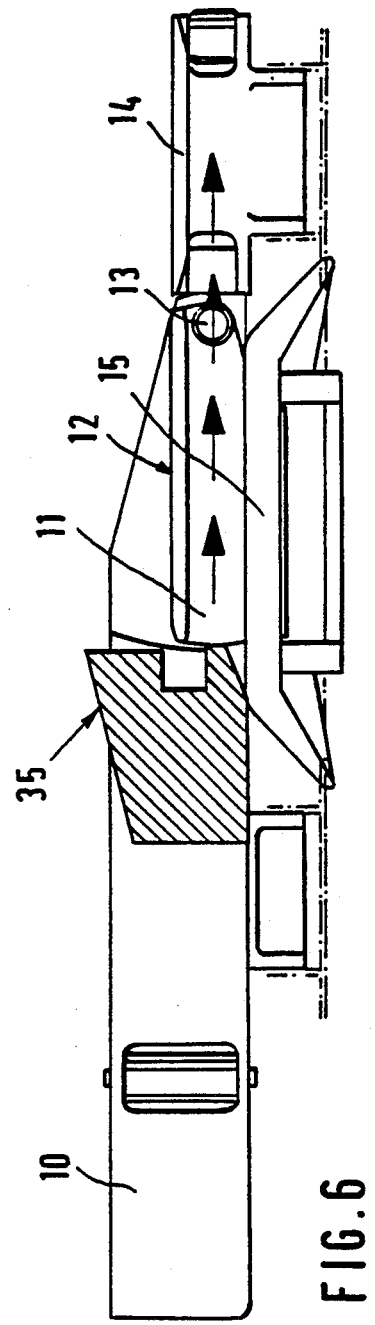
FIG. 5
FIG. 6

APPARATUS FOR AUTOMATIC INSERTION AND ALIGNMENT OF FREIGHT UNITS

BACKGROUND OF THE INVENTION

The present invention is directed to an apparatus for automatic insertion and alignment of freight or cargo units, such as pallets or containers, in mobile cargo compartments, with conveyor paths including storage locations for the freight units with latching elements projecting from such locations. The latching elements engage into guide elements on the freight units for the insertion and arresting or locking the freight units in place.

When transporting freight units, such as pallets or containers in mobile cargo compartments, it is important to rapidly load and unload the transport means utilized. This is particularly significant in cases where long loading and unloading times immobilize expensive transport means, such as transport airplanes. The loading and unloading of mobile cargo containers, however, frequently leads to overloading the freight or cargo containers, whereby the freight units deform at corners or edges due to overloads, especially in the case of pallets. Such deformations are frequently the cause of disruptions, since the edges or corners or guide elements of the freight units are not engaged by the latching elements of in the cargo compartments in the manner intended.

To avoid this problem, in the past, a forced guiding or pressing down of the deformed freight units using rigid guide rails directed obliquely downwards has been used. Such guide rails, however, are effective only where pallets are transported. Since containers have grooves different from the retaining means of pallets, the transportation in common of pallets and containers is impossible because of the guide rail required for the guiding operation.

SUMMARY OF THE INVENTION

Therefore, the primary object of the present invention is to provide an apparatus for automatic insertion and alignment of freight units, so that pallets and containers can be transported together or in common. In accordance with the present invention, the apparatus includes a pivotal guide lever including a hold-down member or pressure pad, and the guide lever is adjustable for the insertion of the freight units by an adjustment lever extending upwardly from the base of the cargo compartment whereby it can be displaced so that the freight units pass over the adjustable lever from three possible directions.

The apparatus of the present invention permits, by pivoting the guide lever, to automatically align and guide or line-up deformed pallets and containers and thus to transport them in common or together. Accordingly, it is appropriate to position the guide lever at an entry guide in the region of an opening into the mobile cargo compartment and to connect the guide lever by coupling members with the adjustment or actuating lever. The hold-down member is adjustable so that it is positioned at the level of a so-called "Z-latch" of the freight loading system when the guide lever is pivoted.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 2 is a front view of the apparatus shown in FIG. 1;

FIG. 3 is a plan view of the apparatus shown in FIG. 1;

FIG. 4 and 4' are sectional views taken along the line IV—IV in FIG. 2 displaying two different positions of the guide lever;

FIG. 5 is a view similar to FIG. 2 illustrating an alignment procedure for a pallet; and FIG. 6 is a view similar to FIG. 5, depicting an alignment process for a container.

DETAILED DESCRIPTION OF THE INVENTION

Figure 1:
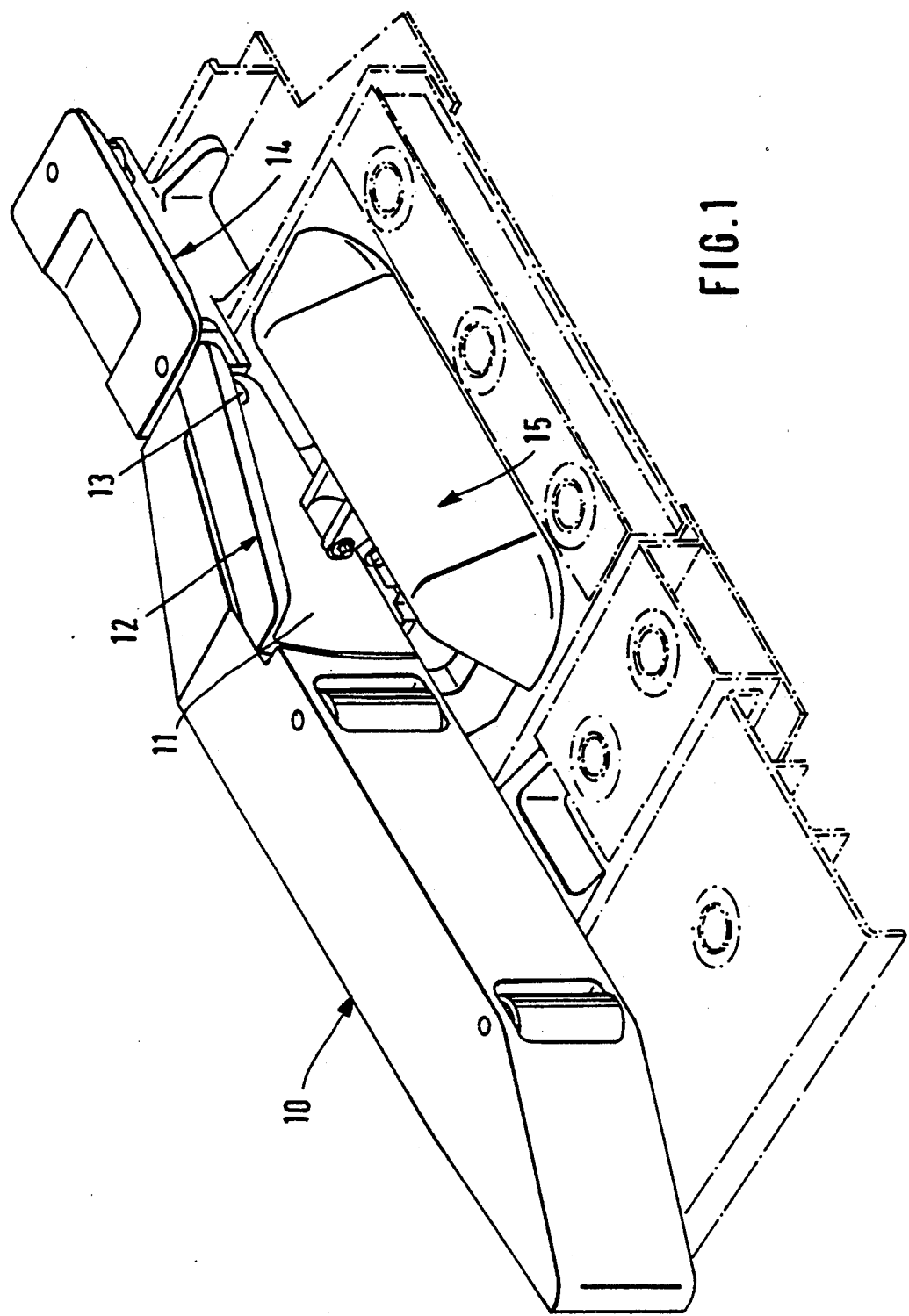
FIG. 1 is a perspective view of an apparatus, embodying the present invention, for automatic entry and alignment of freight units.

As set forth in the perspective view of FIG. 1, an apparatus for automatic entry and alignment of freight units is located at an entry guide 10 in the region of an opening into a transport aircraft. A guide lever 11 extending in the long direction of the entry guide 10 includes a hold-down member 12 and the lever is pivotally supported on a bearing bolt 13 located in the side wall of the entry guide 10. As shown in FIGS. 4 and 4', hold-down member 12 is pivotally displaceable from the oblique position shown in FIG. 1 into a horizontal position, note FIG. 4' coincident with the level of a Z-latch 14 located downstream of the pivot lever in the path of movement of the freight units. An adjustment lever 15 pivots the guide lever 11. Adjustment lever 15 is an elongated body extending in the long direction of the entry guide 10 and its opposite ends are beveled at approximately 45° to the base of the cargo compartment. The adjustment lever 15 is supported at the entry guide 10 transversely of its long direction, whereby its bearing axis extends parallel to its long direction. The adjustment lever 15 is supported and arranged at the entry guide 10, so that it projects upwardly from the bottom of the cargo compartment. In FIG. 2 and FIG. 4, the upward projection of the adjustment lever 15 is illustrated while FIG. 4' shows the adjustment lever pivotally displaced downwardly so that the freight unit can move or pass over it. In the position illustrated in FIG. 4' the surface of the adjustment lever 15 is located in the bottom plane of the cargo compartment.

The displacement movement of the adjustment lever 15 is transmitted to the guide lever 11 as displayed in FIGS. 4 and FIG. 4', so that when a freight unit passes over the adjustment lever 15, the guide lever 11 is pivoted downwardly from the position shown in FIGS. 1 and 4. Accordingly, the adjustment lever 15 is coupled to a side bar 17 by a bolt or pin 16, and the side bar is coupled by another bolt 18 spaced from the bolt 16 to a transmission lever 19. Note in FIGS. 4 and 4', that the transmission lever 19 is located in the entry guide 10 below the guide lever 11 and is supported in the entry guide by a bearing bolt 20 and is coupled by a spring 21 with a lowering lever 22 also mounted on the bearing bolt 20. An upwardly extending coupling link 23 is connected at its lower end to the lowering lever 22, while its upper end is articulated to a support bar 25 extending through an opening in the entry guide 10 and connected to the guide lever 11. The coupling link 23 is articulated to the support bar 25 by a bearing bolt 24. A return spring 26, located at the bearing bolt 20, acts between the entry guide 10 and the transmission lever 19 for returning the adjustment lever 15 and with it the guide lever 11 into the upper position shown in FIG. 4.

As displayed in FIG. 5, a pallet 30 is engaged by the hold-down member 12 of the guide lever 11 as it moves into the cargo compartment and is guided below the Z-latch 14 of a freight or cargo system. If the freight unit is a container 35, as shown in FIG. 6, having a groove as a guide element, the entry and insertion of the container is effected by the pivotal displacement of the guide lever 11 shown in FIG. 6. Accordingly, both pallets and freight containers can be moved into and aligned within the cargo compartment with the described apparatus for automatic entry and insertion of the freight units without encountering any problems.

While specific embodiments of the invention have been shown and described in detail to illustrate the application of the inventive principles, it will be understood that the invention may be embodied otherwise without departing from such principles.

We claim:

1. Apparatus for automatic insertion and alignment of freight units, such as pallets and containers, in mobile cargo compartments with conveyor paths including storage locations for the freight units and latching elements extending from the conveyor paths, said latching elements guide and lock the freight units and engage with guide elements provided on said freight units, wherein said apparatus comprises a pivotal guide lever (11) including a hold-down member (12) located in the conveyor path, an adjustment lever (15) is arranged in and extends upwardly from the bottom of the cargo container and is displaceable so that freight units can pass thereover, and said adjustable lever is connected to said guide lever for pivotally displacing said guide lever as freight units pass over said adjustable lever.

2. Apparatus, as set forth in claim 1, wherein said guide lever (11) is pivotally mounted at an entry guide (10) located in the region of an opening of the mobile cargo compartment and said guide lever (11) is connected with said adjustment lever (15) by coupling links, said entry guide (10) is elongated with the long direction thereof extending in the direction of the conveyor path.

3. Apparatus, according to claim 2, wherein said hold-down member (12) of said guide lever (11) is pivotally displaced between a first position and a second position and in the second position said hold-down member is pivoted toward the bottom of the cargo compartment in a plane coinciding with the plane of said latching elements (14) in the cargo compartment.

4. Apparatus, as set forth in claim 3, wherein said entry guide (10) has a first side facing said adjustment lever and a second side facing the opposite direction, said guide lever (11) is pivotally supported on a bearing bolt (13) mounted in the entry guide (10) and extending transversely of the long direction thereof, said guide lever (11) has a first side facing said adjustment lever (15) and a second side facing in the opposite direction, at least one support bar (25) is located in part on the second side of said entry guide lever (11) and supports said bearing bolt, and an elongated coupling link (23) is articulated to said support bar (25) at one end and is articulated at the other end to a lowering lever (22) located within said entry guide (10) and spaced downwardly from said support bar (25).

5. Apparatus, as set forth in claim 4, wherein said lowering lever (22) is articulated along with a transmitting lever (19) to said entry guide (10) on the second side thereof, a spring (21) couples said transmitting lever (19) to said entry guide (10), said transmitting lever (19) has a first end articulated to said entry guide (10) and a second end coupled to a side bar (17), said transmitting lever (19) is pivotally displaceable counter to a return spring (26) located at the first end thereof, and said side bar (17) is articulated with said adjustment lever (15) on the first side of said entry guide (10).

6. Apparatus, as set forth in claim 5, wherein the pivotal movement of said guide lever (11) is limited by said support bar (25) contacting an opening in said entry guide (10) with said opening extending between the first and second sides of said entry guide.

7. Apparatus, as set forth in claim 6, wherein said coupling link (23) is articulated at said one end which is the upper end thereof to said support bar (25) and at said other end which is the lower end thereof to said lowering lever (22).

8. Apparatus, as set forth in claim 7, wherein said adjustment lever (15) is elongated in the long direction of said entry guide (10) and is supported transversely of the longitudinal direction and said adjustment lever has ends spaced apart in the elongated direction thereof with said ends being beveled.

9. Apparatus, as set forth in claim 8, wherein the beveled ends of said adjustment lever (15) are beveled at an angle of approximately 45° to the bottom of the cargo compartment.

10. Apparatus, as set forth in claim 9, wherein said adjustment lever (15) has a side thereof extending in the elongated direction of the adjustment lever with said side being arranged at approximately 60° to the bottom of the cargo compartment.

* * * * *